A. P. FIX.
COMBINATION END GATE AND STEP FOR TRAILERS.
APPLICATION FILED MAR. 3, 1920.
1,340,761.
Patented May 18, 1920.
2 SHEETS—SHEET 1.
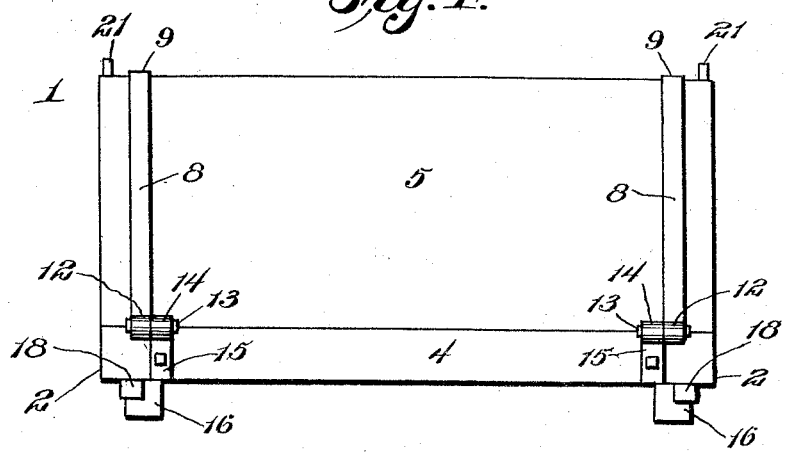
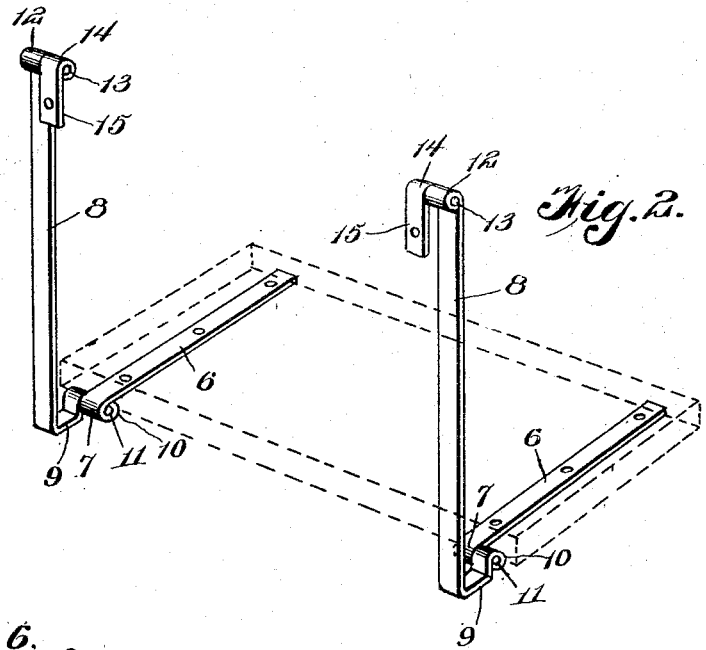
Inventor
A. P. Fix
By
Attorney A. P. FIX.
COMBINATION END GATE AND STEP FOR TRAILERS.
APPLICATION FILED MAR. 3, 1920.
1,340,761.
Patented May 18, 1920.
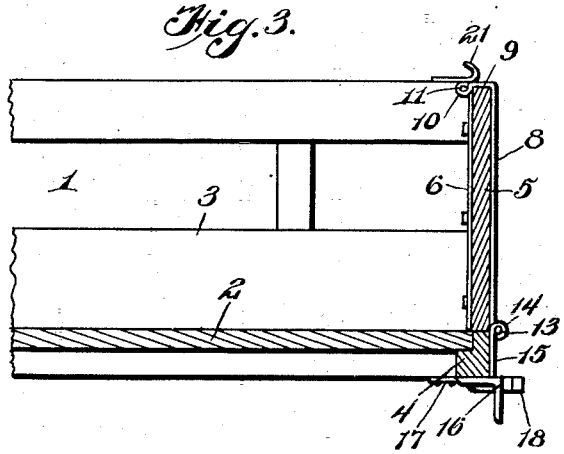
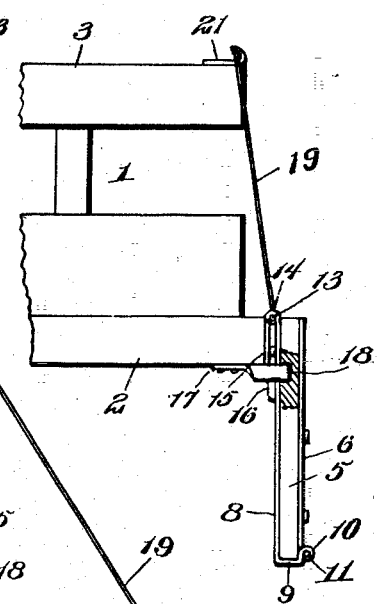
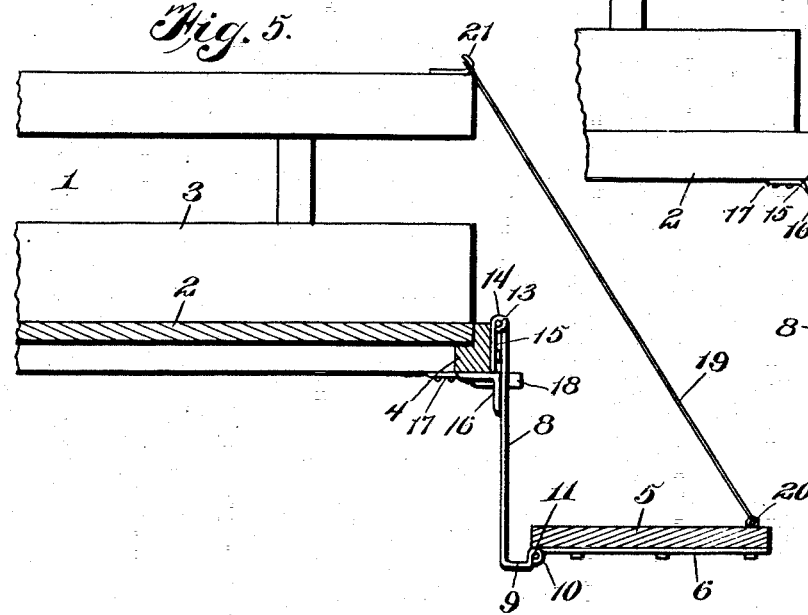
Inventor
A. P. Fix

UNITED STATES PATENT OFFICE.

ALBERT P. FIX, OF DETROIT, MICHIGAN.

COMBINATION END-GATE AND STEP FOR TRAILERS.

1,340,761.  Specification of Letters Patent.  Patented May 18, 1920.

Application filed March 3, 1920. Serial No. 362,964.

*To all whom it may concern:*

Be it known that I, ALBERT P. FIX, a citizen of the United States, residing at Detroit, in the county of Wayne and State of Michigan, have invented new and useful Improvements in Combination End-Gates and Steps for Trailers, of which the following is a specification.

This invention relates to a combination end drop gate and step for automobile trailers and other vehicles.

One object of the invention is to provide a simple and light, but strong and substantial, construction of end gate which when let down will form a step, and which will be efficiently stayed or braced in step-forming position.

Another object of the invention is to provide a device of the character described which may be conveniently applied to any ordinary type of trailer or other wagon-like vehicle, and which is adapted, when desired, to be readily secured in ordinary open position and held from movement to a step-forming position.

The invention consists of the features of construction, combination and arrangement of parts, hereinafter fully described and claimed, reference being had to the accompanying drawings, in which:—

Figure 1 is a rear elevation of a vehicle body embodying my invention, and showing the same in closed position.

Fig. 2 is a perspective view of the device detached from the vehicle, and as the parts appear when the gate is let down to form a step, the gate appearing in dotted lines.

Fig. 3 is a vertical longitudinal section through the rear end of the vehicle and showing the end gate in closed position.

Fig. 4 is a side elevation showing the gate open but not let down to form a step.

Fig. 5 is a view similar to Fig. 3 showing the gate in step forming position.

Fig. 6 is a sectional plan view on line 6—6 of Fig. 4.

Referring to the drawings, 1 designates the body of a trailer or other similar vehicle, including the bottom 2, sides 3 and the rear end sill or cross bar 4.

A combined end gate and step 5 is provided for closing the rear end of the vehicle body, and to serve as a step at such end of the body. This combination gate and step comprises a board of a height substantially equal to the height of the body above the bottom 2 and of a length to abut at the end edges, of its inner face, against the rear edges of the sides 3, when said gate is in closed position. Secured to the inner faces of the board 5 are supporting straps 6, which extend vertically of the board, and are provided at their upper ends with hinge knuckles or eyes 7. Arranged to normally extend upon the outer face of the board 5 and vertically thereof are suspension straps 8, which are provided at their upper ends with substantially U-shaped offsets 9 terminating in hinge knuckles or eyes 10, which are pivotally connected with the knuckles or eyes 7 of the straps 6 by pivot pins or bolts 11.

When the board or gate 5 is in normal vertical or closed position, as shown in Figs. 1 and 3, the offsets 9 embrace and form seat recesses receiving the upper edges of the board 5, and the straps 6 and 8 bear against the inner and outer faces of the board and hold the same snugly in closed position. The straps 8 are provided at their relatively lower ends with hinge knuckles or eyes 12 which are pivotally connected by pivot pins or bolts 13 with similar knuckles or eyes 14 upon attaching brackets 15 bolted or otherwise firmly secured to the outer face of the cross bar or sill 4.

With the above construction, it will be understood that the board 5 is pivotally connected at its normally upper edge with the upper ends of the suspension straps 8, which are free from connection with the board but pivotally connected at their relatively lower ends to the bracket members 15, whereby the board is adapted to be swung upwardly to a vertical body closing position, in which it is disposed between and parallel with the straps 6 and 8. Also by the construction described it will be seen that the board is pivotally connected by the straps 8 with the bracket members 15, whereby said board may be swung downwardly to the depending vertically open position shown in Fig. 4, in which position it is still disposed between and parallel with the straps 6 and 8. It will further be evident that when the board is swung downwardly to the position shown in Fig. 4, it may be let down or turned outwardly at right angles to the straps 8 to form a foot board or step, as shown in Fig. 5, for convenience in permitting a person to readily step upwardly into the body 1 and descend therefrom to the ground.

Secured to the sill 4 are angular brackets 16 which are so disposed as to lie in the path of the straps 8 when the latter are swung downwardly into the vertical position shown in Figs. 4 and 5, so that said brackets 16 will serve as stops to stay and prevent forward swinging movement of the gate as a whole, when the latter is disposed in the position shown in Fig. 4, or of the straps 8 when the parts are disposed in the position shown in Fig. 5, so as to sustain the parts against forward displacement and relieve the pivot members 13 from undue strain. Spring latch members 17 are disposed upon the underside of the sill 4 and have beveled and shouldered free latch ends 18 projecting outwardly beyond the body to hook over the outer faces of, and at one side of the straps 8, when the latter are disposed in the positions as shown in Figs. 4 and 5, in order to firmly retain the same from outward or swinging movement in the travel of the vehicle. When the gate is swung downwardly to the position shown in Fig. 4, the recesses 22 will engage over the beveled ends of said latch bars 17 to allow the gate to vertically contact the straps 8 and the latter to move into engagement with the stop brackets 16, where the same are firmly held by the latches 17, the latter having engaged the straps 8 for the purpose. These latch ends 18 may be moved outward or retracted under pressure to permit movement of the straps 8 when it is desired to swing the gate upwardly to the closing position shown in Figs. 1 and 3.

For the purpose of staying and supporting the board under pressure, when said board is lowered to either of the positions shown in Figs. 4 and 5, bracing ropes, cables or chains 19 are provided which are secured at their outer ends to eye bolts 20 disposed adjacent to the outer front corners of the board 5, and which are suitably attached at their inner or upper ends to hooked suspension brackets 21 secured to the upper edges of the sides 3, the connections 19 being of a proper flexibility to fold and permit movement of the gate to the position shown in Figs. 3 and 4 without interference with such movements. If desired the brackets 21 may be so arranged as to bear with a spring frictional binding pressure on the upper edge of the gate when in closed position, thus serving as latches to hold it in such position, or any other suitable means for this purpose may be employed.

From the foregoing description taken in connection with the drawings, the construction and mode of operation of my improved combination end gate and foot board will be readily understood, and it will be seen that the invention provides a simple and inexpensive construction of device of this character which is light in weight and may therefore be readily used upon automobile trailers or other light vehicles but at the same time is staunch and rigid in its adjusted positions and thus adapted for use for a long period without causing undue wear and tear upon the parts thereof. It will be evident that the great advantage of lightness of weight is obtained by employing straps and brackets of the construction described, and that the employment of these parts also insures economy of manufacture and the production of a device which will be sufficiently light in weight for use upon trailers and other very light vehicles, and yet possesses the requisite strength and durability. While I have described the gate 5 as a "board" it will, of course, be understood that this may be made of a single piece of wood or metal or of any desired sectional construction.

Having thus fully described my invention, I claim:

1. In a combined end gate and step, the combination of a vehicle body, brackets secured to the rear end of the body, a combined gate and foot board, supporting straps attached to the inner face of the board, suspending brackets arranged upon the outer face of the board and hinged at their upper and lower ends respectively to the brackets and upper ends of the supporting straps, whereby the board is adapted to be swung downward to open position parallel with the suspending straps and to step forming position at right angles to said straps, and means for staying the board in step forming position.

2. In a combined end gate and step, the combination of a vehicle body, brackets secured to the lower rear portion of the vehicle body, a board, straps secured to the inner face of the board, straps arranged upon the outer face of the board and hinged at their lower ends to said brackets, said straps being provided at their upper ends with U-shaped offsets adapted to receive and engage the upper edge of the board and hinged to the upper ends of the first-named straps, and means for staying the board in its let down positions.

3. In a combined end gate and step, the combination of a vehicle body, brackets secured to the lower rear portion of the vehicle body, a board, straps secured to the inner face of the board, straps arranged upon the outer face of the board and hinged at their lower ends to said brackets, said straps being provided at their upper ends with U-shaped offsets adapted to receive and engage the upper edge of the board and hinged to the upper ends of the first-named straps, stops upon the body lying in the path of the outer straps for supporting the same when disposed in a pendent position, and means for bracing the board from the body when disposed in step forming position.

In testimony whereof I affix my signature.

ALBERT P. FIX.